United States Patent
Kreevoy et al.

[15] 3,649,298
[45] Mar. 14, 1972

[54] CARBONATION CONCENTRATES FOR BEVERAGES AND PROCESS OF PRODUCING CARBONATED BEVERAGES

[72] Inventors: Maurice M. Kreevoy; Dolores E. Popowitz, both of Minneapolis, Minn.

[73] Assignee: General Mills, Inc.

[22] Filed: Apr. 16, 1970

[21] Appl. No.: 29,292

[52] U.S. Cl. ..........................................99/78, 99/28, 99/79
[51] Int. Cl. ......................................A23l 1/00, A23l 1/26
[58] Field of Search ............99/78, 79, 28; 260/307 B, 534 E

[56] References Cited

UNITED STATES PATENTS 2,984,543 5/1961 Smith..........................................99/78
3,441,417 4/1969 Feldman et al. ...........................99/79

Primary Examiner—Morris O. Wolk
Assistant Examiner—Stephen B. Davis
Attorney—Anthony A. Juettner and Gene O. Enockson

[57] ABSTRACT

Disodium salts of N-carboxy amino acids are added to beverage concentrates which contain N-carboxy amino anhydrides that release carbon dioxide when the concentrate is added to water. The concentrate can also include an inorganic carbonating system comprising a carbonate or bicarbonate and a water soluble acid. Additives such as flavoring, sweetening, and coloring agents can also be included in the concentrate.

8 Claims, No Drawings

CARBONATION CONCENTRATES FOR BEVERAGES AND PROCESS OF PRODUCING CARBONATED BEVERAGES

The present invention relates to concentrates for use in the preparation of carbonated beverages and to the process for preparing such beverages. More particularly, it relates to such concentrates and process employing combinations of certain N-carboxy-amino acid anhydrides with the disodium salts of N-carboxy-amino acids.

It has recently been discovered that a portion of the conventional inorganic carbonating systems in dry beverage mixes could be replaced with glycine anhydride, $\beta$-alanine anhydride, an $\alpha$-alanine anhydride (L—D— or DL—) or mixtures thereof to yield improved concentrates which could be used to provide carbonated beverages with a reduced salt content and reasonably sustained carbonation. The addition of such improved concentrates to cold water yields an initial burst of carbon dioxide due to the inorganic carbonating system and a continued production of carbon dioxide due in large measure to the designated anhydrides.

While the described improved concentrates provide advantages as set forth, they yield beverages often having an initial bitter taste apparently due to the anhydride. Additionally, when the concentrate is added to cold water, there is a lag time between the initial carbon dioxide ebullition from the inorganic system and the starting of the carbon dioxide ebullition from the anhydride. It would be desirable to provide a concentrate where there was also carbon dioxide ebullition during this lag time or period.

We have now discovered that when the disodium salts of the N-carboxy-amino acids are used in combination with the said anhydrides in beverage concentrates, the initial bitter taste of the resulting beverage is substantially reduced. In addition, the said salts provide carbonation at an early stage when the anhydrides themselves have not yet begun to evolve carbon dioxide to any significant extent. Our invention thus provides beverage concentrates comprising the defined anhydrides and disodium salts with or without inorganic carbonating systems.

Glycine anhydride has the formula:

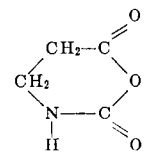

and can be produced by reacting glycine with phosgene as illustrated the following example.

EXAMPLE A

Phosgene was bubbled into a suspension of 15 g. finely ground glycine in 750 ml. anhydrous dioxane. The suspension was stirred and held at 48° C. for 5 hours with continuous introduction of phosgene for 2 hours. At the end of this time, a clear colorless solution resulted. This was concentrated by distillation and ethyl ether added to precipitate 14.7 g. of the anhydride which was a light tan solid having an m.p. of 100° C. (dec.).

$\alpha$-alanine anhydride has the formula

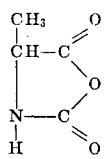

and is prepared in the same way as glycine anhydride—i.e., by reacting $\alpha$-alanine with phosgene.

$\alpha$-alanine anhydride has the formula

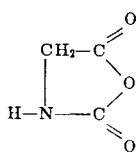

and can be prepared by reacting N-carbobenzoxy-$\beta$-alanine with phosphorus tribromide as shown by the following example.

EXAMPLE B

To 300 ml. methylene chloride was added 22.5 g. N-carbobenzoxy-$\beta$-alanine. Phosphorus tribromide (10.5 cc.) was added slowly and after approximately one hour, a light brown, clear solution resulted. The solvent was partially removed under vacuum and petroleum ether added to precipitate the alanine anhydride as a pale yellow solid.

The disodium salts are prepared by reacting sodium carbonate with the corresponding aminoacid. N-carboxy-glycine disodium salt has the formula: NaOOC—NH—CH$_2$—COONa and can be prepared as follows:

EXAMPLE C

One hundred six grams Na$_2$CO$_3$ and 75 g. glycine were added to 450 ml. H$_2$O. The resulting solution was filtered and then 2 liters of CH$_3$OH was added thereto slowly and continually over a one-hour period with stirring. The white, finely divided disodium salt was filtered from the reaction mixture, washed with methanol, washed with ether and vacuum dried at 100° C. to a constant weight.

$\alpha$- and $\beta$-alanine disodium salts can be prepared in a similar manner and have the formulas

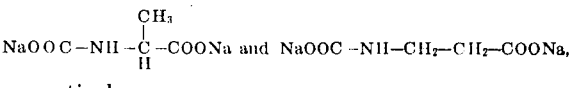

respectively.

Any of the conventional inorganic carbonating systems can be used in combination with the combination of the anhydride and the disodium salts. Various carbonates and bicarbonates, especially of the alkali metal and alkaline earth metals, can be used but the preferred materials are sodium bicarbonate, sodium carbonate, potassium bicarbonate, calcium carbonate and mixtures thereof. It is often preferred to use a combination of sodium and/or potassium bicarbonate with calcium carbonate. The latter increases the period of time in which the inorganic carbonating systems release carbon dioxide gives a longer ebullition. However, the same is comparatively insoluble and thus may produce cloudiness if used in too high an amount unless treated specially or used in combination with one or more alkali metal bicarbonates. Potassium bicarbonate yields beverages having less salt flavor since potassium is the least taste producing of the alkali metals. However, the same is more expensive than sodium bicarbonate.

Any solid water soluble acidifier capable of reacting with the inorganic carbonate or bicarbonate to release carbon dioxide can be used in the inorganic carbonating systems. Acidifiers include a number of acid salts and the like but are preferably the inorganic or organic water soluble acids such as citric acid, fumaric acid, and the like. The acid is used in an amount sufficient to react with and release the CO$_2$ of the inorganic carbonate or bicarbonate. Of course, an excess over the stoichiometric amount can be used and such excess is often desired as, for example in fruit flavored beverages. Citric acid is especially preferred as the acidifier for the production of many flavored beverages, particularly those of the fruit type.

The disodium salts are used in an amount sufficient to reduce initial bitterness caused by the anhydride when the concentrate is mixed with water to form a beverage. Preferably, the disodium salt will be used in an amount of about 10 to 100 percent by weight based on the weight of the anhydride. The combination of the anhydride and disodium salt can be used alone in the concentrates of the invention but it is preferred to also include the inorganic carbonating system as above described. Any amount of such inorganic carbonating systems may be used. However, it is preferred that 20 to 80 percent of the releasable carbon dioxide content of the concentrate be obtained from such systems and 80 to 20 percent thereof from the anhydride-disodium salt combination. It is especially preferred that the anhydride disodium salt combination contributes about 40 to 60 percent of the total amount of releasable carbon dioxide with the remainder being contributed by the inorganic carbonating systems.

The concentrates of the invention can be added to already flavored water or various flavoring, sweetening agents and the like can form a part thereof. Any of the conventionally used sugars and artificial sweeteners can be included in the concentrates as well as natural and artificial colors and flavors. A variety of other additives may be included for their desired functions. Thus, sodium carboxymethylcellulose (CMC) and hydrolyzed cereal solids can be included to improve the mouth feel of the resulting beverage. The latter also tends to hold the carbon dioxide in the beverage for an increased length of time. Polyethylene glycols—i.e., polyethylene glycol 6000 (PEG 6000)—can be included as binders especially where tablets are to be prepared. Ribonucleotides can be added to reduce the aftertaste of saccharin when the same is present.

The concentrates can be used in any of the conventional physical forms as powders, tablets and the like. In the desired form, they are added to water having a temperature of less than about 25° C. and preferably in the range of about 4° to 15° C. The concentrate is added to the water in an amount sufficient to give the desired carbonation in the resulting beverage. Preferably, a sufficient amount of the concentrate is employed to yield at least about 1.5 milliliters of carbon dioxide per milliliter of water. For many flavored beverages, it is preferred that at least about 2.0 milliliters of carbon dioxide per milliliter of water are obtained.

The following examples illustrate certain preferred embodiments of the invention without being limiting.

EXAMPLE I

A concentrate was prepared by dry blending the following ingredients:

| | Weight Ratio in Grams |
|---|---|
| Glycine anhydride | 2.30 |
| N-carboxy-glycine disodium salt | .55 |
| NaHCO$_3$ | .45 |
| CaCO$_3$ | .26 |
| KHCO$_3$ | .30 |
| Citric acid | 2.80 |
| Ca cyclamate:Na saccharin blend (15:1 weight ratio) | .30 |
| CMC | .04 |
| Ribonucleotide (Mertaste) | 0.16 |

Addition of 6.016 g. of this concentrate to 8 oz. of cold water (approximately 12° C.) yielded a beverage having extended initial carbonation and continued carbonation from the anhydride. Further, the beverage had reduced initial bitterness over a beverage prepared from essentially the same concentrate except that the N-carboxy-glycine disodium salt was not included. The latter concentrate also had a reduced carbon dioxide ebullition after a few minutes and before the anhydride became active.

EXAMPLE II

Example I was repeated except that the NaHCO$_3$, CaCO$_3$ and KHCO$_3$ were replaced by an additional 1.0 gram of N-carboxy-glycine disodium salt. Essentially the same results were obtained with reduction in initial bitterness due to the anhydride. Initial carbon dioxide evolution was not as great, however, in the absence of the inorganic carbonates.

It is to be understood that the invention is not to be limited to the exact details of operation or the exact compositions shown or described, as obvious modifications and equivalents will be apparent to those skilled in the art and the invention is to be limited only by the scope of the appended claims.

The embodiments of the invention in which an exclusive property or privilege is claimed are defined as follows:

1. In a dry concentrate capable of producing a carbonated beverage upon being mixed with water comprising an N-carboxy-amino acid anhydride selected from glycine anhydride, an α-alanine anhydride, β-alanine anhydride and mixtures thereof the improvement comprising including in such concentrate a sufficient amount of a salt to reduce the initial bitterness of the beverage prepared from the concentrate, said salt having the formula

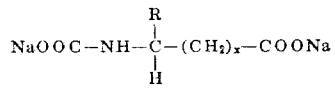

where R is H or CH$_3$ and $x$ is 0 or 1 when R is H and 0 when R is CH$_3$.

2. The concentrate of claim 1 where the salt is used in an amount of about 10 to 100 percent by weight based on the weight of the anhydride.

3. The concentrate of claim 2 wherein the anhydride is glycine anhydride, $x$ is 0 and R is H.

4. The concentrate of claim 1 which also contains an inorganic carbonating system.

5. The concentrate of claim 4 wherein the concentrate comprises 20 to 80 percent of the inorganic carbonating system and 80 to 20 percent of the anhydride and salt, said % being based on the amount of releasable carbon dioxide in the concentrate.

6. The concentrate of claim 5 wherein the inorganic carbonating system consists of sodium bicarbonate, potassium bicarbonate, calcium carbonate and citric acid, the anhydride is glycine anhydride, $x$ is 0 and R is H.

7. In a process of preparing a carbonated beverage from cold water and a dry concentrate comprising an N-carboxy-amino anhydride selected from glycine anhydride, α-alanine anhydride, β-alanine anhydride and mixtures thereof, the improvement comprising including in such concentrate a sufficient amount of a salt to reduce the initial bitterness of the beverage, said salt having the formula

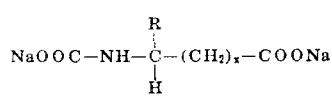

where R is H or CH$_3$ and $x$ is 0 or 1 when R is H and O when R is CH$_3$.

8. The process of claim 7 wherein the dry concentrate also contains an inorganic carbonating system, the anhydride is glycine anhydride, R is H, $x$ is 0 and the concentrate is used in an amount sufficient to provide at least 1.5 milliliters carbon dioxide per milliliter of water.

* * * * *